(12) United States Patent
Payeur et al.

(10) Patent No.: US 10,396,522 B2
(45) Date of Patent: Aug. 27, 2019

(54) PULSE COMPRESSION IN CHIRPED PULSE LASER SYSTEMS

(71) Applicant: Infinite Potential Laboratories LP, Waterloo (CA)

(72) Inventors: Stephane Payeur, Montréal (CA); Sylvain Fourmaux, Montréal (CA); Jean Claude Kieffer, Montréal (CA); Steve MacLean, Saint Lambert (CA)

(73) Assignee: Infinite Potential Laboratories LP, Waterloo, Ontario (CA)

( * ) Notice: Subject to any disclaimer, the term of this patent is extended or adjusted under 35 U.S.C. 154(b) by 0 days.

(21) Appl. No.: 16/061,564

(22) PCT Filed: Dec. 15, 2016

(86) PCT No.: PCT/CA2016/051485
§ 371 (c)(1),
(2) Date: Jun. 12, 2018

(87) PCT Pub. No.: WO2017/100930
PCT Pub. Date: Jun. 22, 2017

(65) Prior Publication Data
US 2019/0115711 A1 Apr. 18, 2019

Related U.S. Application Data

(60) Provisional application No. 62/269,183, filed on Dec. 18, 2015.

(51) Int. Cl.
*H01S 3/10* (2006.01)
*H01S 3/00* (2006.01)
(Continued)

(52) U.S. Cl.
CPC ............ *H01S 3/0057* (2013.01); *H01S 3/027* (2013.01); *H01S 3/1003* (2013.01);
(Continued)

(58) Field of Classification Search
CPC .... H01S 3/0057; H01S 3/027; H01S 3/10053; H01S 3/2308; H01S 3/10038;
(Continued)

(56) References Cited

U.S. PATENT DOCUMENTS

2005/0111515 A1* 5/2005 Diels .................... G02F 1/3511
372/104
2009/0028206 A1* 1/2009 Borneis .............. B23K 26/0604
372/102
(Continued)

OTHER PUBLICATIONS

"Dazzler System Operating Manual, FASTLITE", DAZZLERTM Systems, Nov. 2005, 16 pgs.
(Continued)

*Primary Examiner* — Kinam Park
(74) *Attorney, Agent, or Firm* — Henry Patent Law Firm PLLC

(57) ABSTRACT

In a general aspect, a chirped optical pulse is compressed by operation of diffraction gratings and a dispersive mirror having a smooth reflective surface. In some aspects, a chirped pulse laser system includes a programmable optical dispersive filter (PODF) operable to modify a spectral phase of optical pulses and a pulse compressor that receives an optical pulse based on an output of the PODF. The pulse compressor includes optical elements in a vacuum chamber. The optical elements define an optical path through the pulse compressor, and are arranged to disperse the optical pulse in the optical path. The optical elements include diffraction gratings and a dispersive mirror, which has a smooth reflective surface that defines a portion of the optical path.

24 Claims, 4 Drawing Sheets

(51) Int. Cl.
*H01S 3/23* (2006.01)
*H01S 3/02* (2006.01)
*H01S 3/16* (2006.01)

(52) U.S. Cl.
CPC ...... *H01S 3/10038* (2013.01); *H01S 3/10053* (2013.01); *H01S 3/10061* (2013.01); *H01S 3/2308* (2013.01); *H01S 3/1625* (2013.01); *H01S 3/1636* (2013.01)

(58) Field of Classification Search
CPC .. H01S 3/10061; H01S 3/1625; H01S 3/1636; H01S 3/1003
See application file for complete search history.

(56) References Cited

U.S. PATENT DOCUMENTS

| | | | |
|---|---|---|---|
| 2010/0091359 A1* | 4/2010 | Yamamoto | H01S 3/0057 359/347 |
| 2012/0113513 A1* | 5/2012 | Zhang | H01S 3/027 359/513 |
| 2014/0166906 A1 | 6/2014 | Kim et al. | |
| 2015/0349479 A1* | 12/2015 | Oue | G02B 5/1809 359/571 |

OTHER PUBLICATIONS

Ahmad, et al., "Frontend light source for short-pulse pumped OPCPA system", Applied Physics B, vol. 97, pp. 529-536, Jun. 2009, 8 pgs.
Angelov, "Development of high-damage threshold dispersive coatings", Dissertation, Ludwig-Maximilians-Universität München: Faculty of Physics, 2014, 112 pgs.
Backus, et al., "High power ultrafast lasers", Review of Scientific Instruments, vol. 69, No. 3, pp. 1207-1223, Mar. 1998, 18 pgs.
Braun, et al., "Self-channeling of high-peak-power femtosecond laser pulses in air", Optics Letters, vol. 20, No. 1, pp. 73-75, Jan. 1995, 3 pgs.
Hocquet, et al., "The role of electric field polarization of the incident laser beam in the short pulse damage mechanism of pulse compression gratings", Applied Physics Letters, vol. 99, 061101, Aug. 2011; 3 pgs.
Iyengar, et al., "Ultralow reflectance metal surfaces by ultrafast laser texturing", Applied Optics, vol. 49, No. 31, pp. 5983-5988, Oct. 2010, 6 pgs.
Leshchenko, et al., "Aberration-Free Broadband Stretcher-Compressor System for Femtosecond Petawatt-Level Laser System Based on Parametric Amplification", Atmospheric and Oceanic Optics, vol. 27, No. 6, pp. 573-581, 2014, 9 pgs.
Li, et al., "All-dielectric high-efficiency reflection gratings made with multilayer thin-film coatings", Optics Letters, vol. 20, No. 11, pp. 1349-1351, Jun. 1995, 3 pgs.
Martin, et al., "Surface cleaning of Au mirrors using an RF plasma O source", The Advanced Laser Light Source, Annual Report 2005-2006, pp. 75-77, 2006, 3 pgs.
Poole, et al., "Femtosecond laser damage threshold of pulse compression gratings for petawatt scale laser systems", Optics Express, vol. 21, No. 22, pp. 26341-26351, Oct. 2013, 11 pgs.
Tournois, "Acousto-optic programmable dispersive filter for adaptive compensation of group delay time dispersion in laser systems", Optics Communications, vol. 140, pp. 245-249, Aug. 1997, 5 pgs.
Treacy, "Optical Pulse Compression with Diffraction Gratings", Quantum Electronics, IEEE Journal of Quantum Electronics, vol. 5, No. 9, pp. 454-458, Sep. 1969, 5 pgs.
Verluise, et al., "Amplitude and phase control of ultrashort pulses by use of an acousto-optic programmable dispersive filter: pulse compression and shaping", Optics Letters, vol. 25, No. 8, pp. 575-577, Apr. 2000, 3 pgs.
Pervak, et al., "Chirped-pulse amplification of laser pulses with dispersive mirrors," Optics Express, vol. 17, No. 21, Oct. 8, 2009, 9 pgs.
WIPO, International Search Report and Written Opinion of the ISA dated Jan. 31, 2017, in PCT/CA2016/051485; 7 pgs.
EPO, Extended European Search Report dated Jul. 3, 2019, in EP 16874208.8, 10 pgs.
Chen, et al.; "1-mJ, sub-5-fs carrier envelope phase-locked pulses," Applied Physics B, Lasers and Optics, Springer; Berlin, Germany; vol. 99, No. 1-2; Dec. 1, 2009; 9 pgs.
Niu, et al.; "Dispersive mirrors for high third-order dispersion compensation in femtosecond amplification fiber laser system,"Applied Physics B, Lasers and Optics, Springer; Berlin, Germany; vol. 108, No. 3; May 25, 2012; 6 pgs.

\* cited by examiner

PULSE COMPRESSION IN CHIRPED PULSE LASER SYSTEMS

CROSS-REFERENCE TO RELATED APPLICATIONS

This application claims priority to U.S. Provisional Application No. 62/269,183, filed Dec. 18, 2015 and entitled "Method and System for Ultrashort Pulse Recompression of High Peak Power Laser Beams," which is hereby incorporated by reference.

BACKGROUND

The following description relates to optical pulse compression in chirped pulse laser systems.

Chirped pulse laser systems, such as chirped pulse amplifiers (CPA), amplify short duration laser pulses by stretching a short duration optical pulse, amplifying the stretched optical pulse, and compressing the amplified optical pulse. Optical pulse compression in CPAs is typically performed by diffraction gratings, and the surfaces of these diffraction gratings may deteriorate due to the high field intensity of the compressed amplified optical pulse incident upon the diffraction gratings.

DETAILED DESCRIPTION

Figure 1:
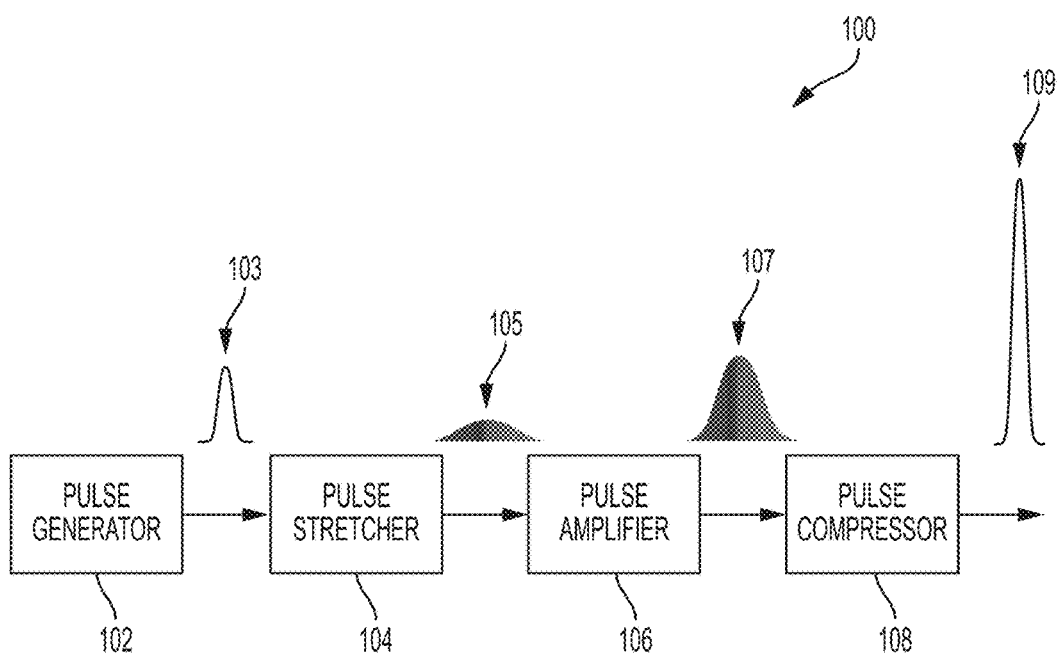
FIG. 1 is a block diagram showing aspects of an example pulse amplification system.

In aspects of what is described here, a chirped pulse laser system (such as a chirped pulse amplifier (CPA)) includes a programmable optical dispersive filter (PODF) and a pulse compressor, among other components. The pulse compressor includes optical elements in a vacuum chamber (e.g., a chamber that operates at less than $10^{-3}$ Torr, less than $2 \times 10^{-8}$ Torr, or another high vacuum pressure), and the optical elements define an optical path through the pulse compressor. In some implementations, the pulse compressor may be operated such that an optical signal in the optical path of the pulse compressor is below a critical power at which self-channeling effects may appear. The optical elements of the pulse compressor are arranged to compress the optical pulse, and may include diffraction gratings and a dispersive mirror. In some examples, each diffraction grating has a ridged reflective surface and the dispersive mirror has a smooth reflective surface. Because the ridged nanostructure of the diffraction gratings makes them susceptible to field enhancement, the dispersive mirror's flat reflective surface may have a higher damage threshold relative to the diffraction gratings. The smooth reflective surface of the dispersive mirror can be formed by alternating layers of dielectric materials on a substrate (e.g., alternating layers of high- and low-index materials, such as Titanium dioxide ($TiO_2$) and Silicon dioxide ($SiO_2$), respectively). In some instances, the dispersive mirror is the last optical element in the optical path. In some instances, the dispersive mirror provides for second order dispersion (or group delay dispersion) of approximately (+/−)300 femtoseconds squared ($fs^2$) for optical pulses with a duration of approximately 15-17 femtoseconds (fs).

Aspects of the present disclosure may provide one or more advantages, in some implementations. For example, a dispersive mirror may better withstand high-intensity optical pulses found in a chirped pulse laser system compared to diffraction gratings (e.g., a dispersive mirror may have a damage threshold more than four (4) times greater than the damage threshold of a diffraction grating). Thus, in some aspects, the dispersive mirror may be used in a pulse compressor of a CPA to reduce the intensity and the damage threshold fluence incident upon one or more diffraction gratings (e.g., the last diffraction grating in an optical path in the pulse compressor) in the pulse compressor by an order of magnitude or more (e.g., by approximately forty percent (40%)). In addition, in some implementations, a wave plate may be used to modify the polarization of the optical pulse in a pulse compressor, which may reduce the damage threshold of the dispersive mirror in the pulse compressor. Compression of a high-power chirped pulse (e.g., from a Petawatt class laser system) may therefore be achieved with less degradation and more lifetime of the optical elements used in the pulse compressor, which may allow for an increased duty cycle or repetition rate of the system. In some aspects, a pulse compressor comprising a dispersive mirror may produce optical pulses having higher peak power, and may do so over the same or similar lifetime as previous systems with only diffraction gratings. In some aspects, a pulse compressor comprising a dispersive mirror may produce optical pulses having the same or similar peak power as previous systems with only diffraction gratings, but with smaller optical elements and therefore reduced costs (e.g., through reduced costs related to one or more of the diffraction gratings or other optical elements in the pulse compressor). In some aspects, the dispersive mirror and diffraction gratings of a pulse compressor may operate under high vacuum pressures (e.g., less than $10^{-3}$ Torr), reducing cumulative non-linear effects caused by certain types of media or combinations of media (e.g., air, Helium, glass, or combinations thereof). In some aspects, the pulse compressor may be configured to produce a transform-limited optical pulse with a negligible B-Integral. In some aspects, the pulse compressor may be configured to produce a single-cycle optical pulse.

FIG. 1 is a block diagram showing aspects of an example pulse amplification system 100. In the example shown, the pulse amplification system 100 includes a pulse generator 102, a pulse stretcher 104, a pulse amplifier 106, and a pulse compressor 108. A pulse amplification system may include additional or different components. In some implementations, the pulse amplification system 100 amplifies broad-spectrum, short duration chirped optical pulses, such as, for example, optical pulses with a duration of less than 50 fs. The duration of the pulse may be measured as the full width of the pulse at half maximum intensity (FWHM). For instance, the pulse amplification system 100 may be configured to produce a pulse with a duration of approximately 15-17 fs with a peak power of approximately 100 TeraWatts (TW).

The example pulse generator 102 generates an optical pulse 103 for amplification by the pulse amplification system 100. In some implementations, the optical pulse 103 is a Fourier transform limited (or transform-limited) optical pulse. In some implementations, the pulse generator 102 includes a femtosecond laser oscillator, such as, for example, a femtosecond Ti:sapphire laser. The pulse generator 102 may include additional or different components. For example, in some implementations the pulse generator 102 includes a chirped pulse amplifier (CPA) in addition to a femtosecond laser oscillator.

The example pulse stretcher 104 receives the optical pulse 103 generated by the pulse generator 102, and stretches the optical pulse 103 to produce the stretched optical pulse 105. The stretched optical pulse 105 may be a chirped optical pulse, with a frequency that is time dependent. The frequency of the stretched optical pulse 105 may increase with time (an up-chirped pulse) or decrease with time (a down-chirped pulse). The pulse stretcher 104 stretches the optical pulse 103 using one or more dispersive optical elements, such as diffraction gratings, optical glass with chromatic dispersion characteristics (e.g., SCHOTT SF57 glass). The dispersive optical elements of the pulse stretcher 104 cause the different wavelength components of the optical pulse 103 to disperse spatially and temporally from one another while travelling through the pulse stretcher 104, causing the stretched optical pulse 105 to have a lower intensity (e.g., an intensity below the damage threshold of the pulse amplifier 106). The dispersive optical elements of the pulse stretcher 104 may positively or negatively disperse the chirped optical pulse received from the pulse generator 102.

In some implementations, the spectral phase of the optical signal produced by the pulse stretcher 104 can be modified. For example, the pulse amplification system 100 may include a programmable optical dispersive filter (PODF) that modifies the spectral phase of the optical signal provided to the pulse amplifier 106. In some cases, an optical signal can be described in the frequency domain, for example, as $$E(\omega)=|E(\omega)|e^{i\phi(\omega)}$$

where $|E(\omega)|$ represents the spectral intensity and $\phi(\omega)$ represents the spectral phase of the optical signal. An optical signal may have another form, for example, with the spectral intensity and spectral phase having another representation. In some cases, a PODF is used to modify the spectral phase of an optical signal such that the optical signal output from the pulse compressor 108 has a flat spectral phase (with all frequency components having the same phase), or to modify the spectral phase of an optical signal such that the optical signal output from the pulse compressor 108 has another spectral phase profile.

In some implementations, the example pulse stretcher 104 includes or is coupled to an acousto-optic programmable dispersive filter (AOPDF), which modifies the spectral phase of the stretched optical pulse 105 while travelling through the AOPDF. The spectral phase modification may be based on an acoustic signal received by the AOPDF. For instance, the AOPDF may include a piezoelectric medium having mechanical properties (e.g., mechanical stress) that are controlled by an applied acoustic signal and influence a spectral phase modification applied to the optical signal. The AOPDF may modify the spectral phase of the stretched optical pulse 105 such that the pulse compressor 108 produces an optical signal that has a flat spectral phase over the different wavelength components of the optical signal. In some instances, the AOPDF may be programmed based on properties of the pulse compressor 108. For example, the AOPDF may be programmed to modify the spectral phase of the optical signal based on the optical properties of dispersive optical elements in the pulse compressor 108.

The example pulse amplifier 106 receives the stretched optical pulse 105 from the pulse stretcher 104, and increases the peak power of the stretched optical pulse. The example pulse amplifier 106 increases the power of the stretched optical pulse using one or more optical elements having a gain medium (e.g., Ti:sapphire) which transfers energy input to the gain medium (e.g., electrical energy) to the stretched optical pulse 105 to produce the amplified optical pulse 107. In some implementations, the pulse amplifier 106 includes a multipass amplifier.

The example pulse compressor 108 is a system of one or more components that receives the amplified optical pulse 107 from the pulse amplifier 106, and compresses the amplified optical pulse 107 using optical dispersion. The example pulse compressor 108 compresses the pulse using one or more dispersive optical elements, such as, for example, diffraction gratings or dispersive mirrors. In the example shown, the dispersive optical elements of the pulse compressor 108 cause an opposite magnitude dispersion of the optical pulse than the dispersive optical elements of the pulse stretcher 104. For example, where the pulse stretcher 104 positively disperses the optical pulse, the pulse compressor 108 negatively disperses the optical pulse. In some implementations, the pulse compressor 108 is configured to at least approximately cancel out the amount of dispersion imparted to the chirped optical pulse 103 by the pulse stretcher 104. In some implementations, the pulse compressor 108 includes a highly dispersive mirror (HDM) that has a smooth reflective surface and is composed of layers of dielectric materials. For example, in some implementations, the HDM includes alternating layers of high- and low-index dielectric materials, such as Titanium dioxide ($TiO_2$) and Silicon dioxide ($SiO_2$), respectively. In some implementations, the total physical thickness of the high-index material is approximately 4700 nm, while the total physical thickness of the low-index material is approximately 7700 m. Other materials and layer thickness can be used.

Figure 2:
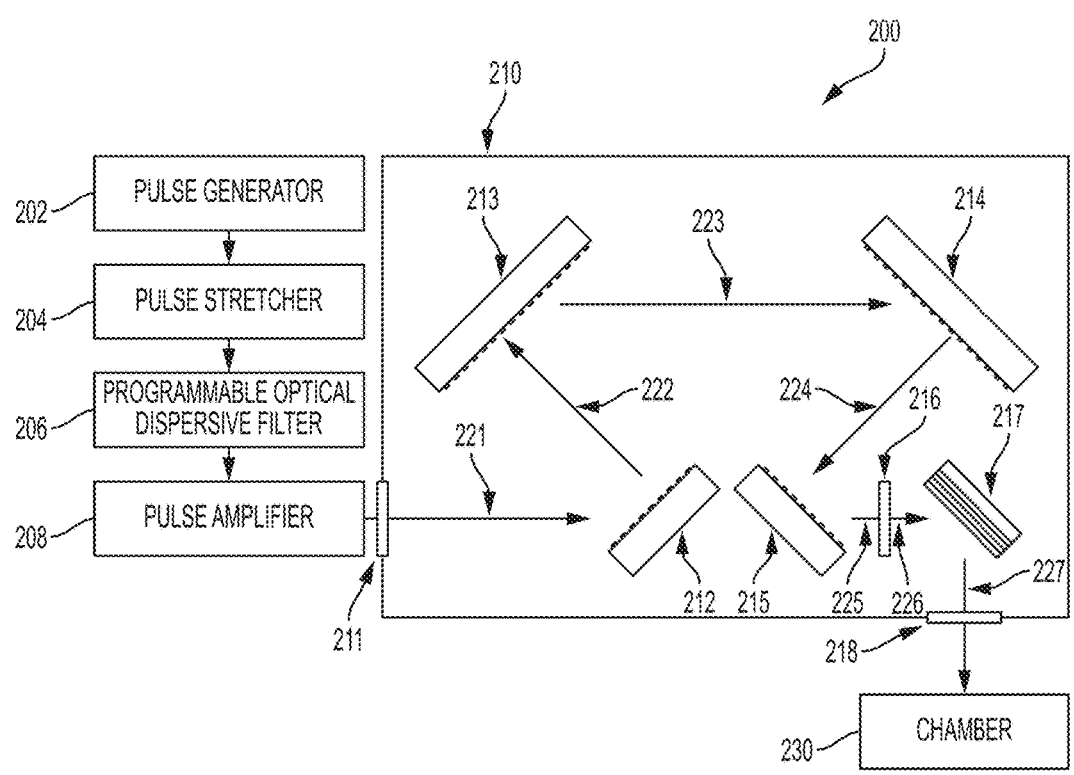
FIG. 2 is a diagram showing aspects of an example chirped pulse amplifier (CPA) system.

FIG. 2 is a diagram showing aspects of an example chirped pulse amplifier (CPA) system 200. In the example shown, the CPA system 200 includes a pulse generator 202, a pulse stretcher 204, a programmable optical dispersive filter (PODF) 206, a pulse amplifier 208, and a pulse compressor 210. Like the pulse amplification system 100 of FIG. 1, the example CPA system 200 amplifies broad-spectrum, short duration chirped optical pulses, such as, for example, those with durations of less than 50 fs. For instance, the CPA system 200 may be configured to produce an amplified optical pulse having a duration of approximately 15-17 fs, a spectrum of 730-870 nm, and peak power of approximately 100 TW. In some implementations, the CPA system 200 may be configured to generate single-cycle optical pulses. For instance, the CPA system 200 may be configured to produce an amplified optical pulse having a duration of approximately 2.66 fs at a wavelength of approximately 800 nm.

In the example shown, the pulse generator 202 generates an optical pulse that is transmitted to the pulse stretcher 204. The example pulse generator 202 includes one or more components that generate a broad-spectrum ultrashort optical pulse. In some cases, the pulse generator 202 can produce Fourier transform limited ultrashort optical pulses. For example, the pulse generator 202 may generate an optical pulse having a duration of 15-17 fs and spectrum of 730-870 nm. In some implementations, the example pulse generator 202 is implemented similar to the pulse generator 102 of FIG. 1. For instance, the pulse generator 202 may include a femtosecond laser oscillator, such as a femtosecond Ti:sapphire laser.

The example pulse stretcher 204 includes one or more dispersive optical elements that stretch an optical signal as it traverses an optical path through the pulse stretcher 204. The dispersive optical elements of the example pulse stretcher 204 temporally broaden the pulse by spatially dispersing the different wavelength components of the optical pulse received from the pulse generator 202. The dispersive optical elements may positively or negatively disperse the optical pulse. In some implementations, the pulse stretcher 204 is implemented similar to the pulse stretcher 104 of FIG. 1. For instance, the pulse stretcher 204 may include one or more diffraction gratings that act to disperse the optical pulse from the pulse generator 202. In the example shown, the pulse stretcher 204 receives the optical pulse from the pulse generator 202, stretches the optical pulse, and transmits the stretched optical pulse to the PODF 206.

The example PODF 206 includes one or more components that modify the spectral phase of the optical pulse as it travels through the PODF 206. In some implementations, the PODF 206 includes an acousto-optic programmable dispersive filter (AOPDF), which receives an acoustic signal and modifies the spectral phase of an optical pulse travelling through the PODF based on the acoustic signal. In some implementations, the PODF 206 is implemented using a DAZZLER system available from FASTLITE. Another type of PODF may be used, and the PODF 206 may include additional or different components. In the example shown, the PODF 206 receives the stretched optical pulse from the pulse stretcher 204, modifies the spectral phase of the stretched optical pulse, and transmits the phase-modified optical pulse to the pulse amplifier 208.

The example pulse amplifier 208 includes one or more components that increase the power of an optical pulse using one or more optical elements having a gain medium (e.g., Ti:sapphire), which transfers energy input to the gain medium (e.g., electrical energy) to the optical pulse. In some implementations, the pulse amplifier 208 includes a multi-pass amplifier. In the example shown, the pulse amplifier 208 receives the phase-modified optical pulse from the PODF 206, amplifies the optical pulse, and transmits the amplified optical pulse to the pulse compressor 210.

The example pulse compressor 210 includes one or more dispersive optical elements that compress an optical signal as it traverses an optical path through the pulse compressor 210. The dispersive optical elements of the example pulse compressor 210 temporally compress the pulse by spatially dispersing the different wavelength components of the optical pulse received from the pulse amplifier 208. In some implementations, the dispersive optical elements of the pulse compressor 210 are in a vacuum chamber. The example pulse compressor 210 includes an optical inlet 211, a first diffraction grating 212, a second diffraction grating 213, a third diffraction grating 214 a fourth diffraction grating 215, a wave plate 216, a dispersive mirror 217, and an optical outlet 218. In some implementations, the pulse compressor 210 includes additional optical elements, such as, for example, one or more mirrors or thin optics between the fourth diffraction grating 215 and the dispersive mirror 217. In the example shown, the pulse compressor 210 receives the amplified optical pulse from the pulse amplifier 208 at the optical inlet 211, compresses the amplified optical pulse, and transmits the compressed optical pulse to the chamber 230 from the optical outlet 218. In some implementations, the optical pulse produced from the optical outlet 218 is a transform-limited pulse. In some implementations, the pulse compressor 210 produces a transform-limited pulse with a negligible B-Integral. In some examples, the beam diameter of the optical pulse at the outlet 218 is approximately 150 millimeters (mm); or the pulse compressor 210 may produce an optical signal having another beam diameter. In some implementations, the optical inlet 211 comprises glass, while the optical outlet 218 comprises an optical tunnel to the chamber 230. The optical tunnel of the optical outlet 218 may be operated at a vacuum pressure, such as, for example, the vacuum pressure of the pulse compressor (e.g., less than $10^{-3}$ Torr).

The example chamber 230 includes components that interact with the compressed optical pulse from the optical outlet 218. In some implementations, the chamber 230 comprises a vacuum chamber operated at a vacuum pressure (e.g., less than $10^{-3}$ Torr). In some implementations, the vacuum chamber of the chamber 230 is operated at the same vacuum pressure as the vacuum chamber of the pulse compressor 210. For example, in some implementations, the chamber 230 includes crystalline materials or other elements that can be used to produce high-energy particles based on the optical pulse from the pulse compressor 210. For instance, the chamber 230 may produce a particle beam, a gamma ray beam, an x-ray beam or another type of output. As an example, the chamber 230 may be configured to produce a x-ray beam by Betatron, Compton, or K-alpha scattering. As another example, the chamber 120 may be configured to produce high duty cycle particle beams or radiation beams.

The diffraction gratings 212-215, wave plate 216, and the dispersive mirror 217 define an optical path within the pulse compressor 210 that includes path portions 221-227. The optical path generally extends from the optical inlet 211 to the optical outlet 218 and includes the series of optical elements and path portions between respective pairs of the optical elements. The path portions 221-227 are regions of the vacuum chamber that reside between the optical elements in the pulse compressor 210, and during operation of the pulse compressor 210, the path portions 221-227 contain gas (e.g., air, Helium, or another gas) at vacuum pressure (e.g., in the range of $2 \times 10^{-8}$ to $3 \times 10^{-8}$ Torr).

The example diffraction gratings 212-215 and the dispersive mirror 217 are arranged in the pulse compressor 210 such that they disperse the optical pulse in the optical path. The diffraction gratings 212-215 and the dispersive mirror 217 may impart positive or negative dispersion on the optical pulse, depending on the dispersion imparted by the pulse stretcher 204 in the example CPA system 200. For example, where the pulse stretcher 204 positively disperses the optical pulse, the pulse compressor 210 negatively disperses the optical pulse. In some implementations, the pulse compressor 210 is configured to at least approximately cancel out the amount of dispersion imparted to the optical pulse by the pulse stretcher 204. In the example shown, the diffraction gratings 212-215 are arranged before the dispersive mirror 217 in the optical path. In some implementations, the diffraction gratings 212-215 may each have 1480 lines per millimeter (l/mm), and may be displaced from one another by 1 mm. Where the diffraction gratings 212-215 are displaced from one another by 1 mm, the diffraction gratings 212-215 may each induce a dispersion of 5500 $fs^2$ and 11,000 $fs^3$ onto an optical pulse in the optical path.

The example wave plate 216 modifies a polarization of the optical pulse as it travels therethrough. For example, the wave plate 216 may modify the polarization of the optical pulse such that it is entirely s-polarized (e.g., by converting p-polarized components to s-polarized components of the optical pulse), which may impart less damage when incident upon the dispersive mirror 217. The wave plate 216 may modify the polarization of the optical pulse in another manner, such as, for example, modifying the optical pulse to be circularly polarized. In some implementations, the wave plate 216 is a half-wave plate. In some implementations, the wave plate 216 is a quarter-wave plate. In some implementations, the wave plate 216 is a segmented wave plate (e.g., with a mosaic pattern) that creates radial-typed polarizations. In the example shown, the wave plate 216 is between the last diffraction grating 215 (the final diffraction grating in the optical path) and the dispersive mirror 217. Although the example CPA system 200 includes one wave plate 216 as shown in FIG. 2, the pulse compressor 210 may include no wave plates or may include additional wave plates.

The example diffraction gratings 212-215, wave plate 216, and dispersive mirror 217 of the pulse compressor 210 reside in a vacuum chamber. In some implementations, one or more diffraction gratings (e.g., the diffraction gratings 212, 213) may reside outside of the vacuum chamber. The vacuum chamber may be configured to operate at a vacuum pressure of less than $10^{-3}$ Torr. For example, in some implementations, the diffraction gratings 212-215, wave plate 216, and dispersive mirror 217 reside in a vacuum chamber that operates at approximately $2.5 \times 10^{-8}$ Torr (in the range of $2 \times 10^{-8}$ to $3 \times 10^{-8}$ Torr). By operating the optical elements in a vacuum chamber under vacuum pressure, non-linear effects caused by media in the optical path between the optical elements (e.g., air) may be reduced or avoided. In addition, in some implementations, the vacuum chamber may be configured to operate at a vacuum pressure that is based on the peak power of the optical pulses travelling in the pulse compressor 210. For example, the vacuum chamber of the pulse compressor 210 may be operated at a particular vacuum pressure such that the peak power of the optical pulses is below a critical power, and the optical pulses may avoid self-channeling effects while traversing the optical path through the pulse compressor 210. By operating the vacuum chamber of the pulse compressor 210 at vacuum pressures less than 10-3 Torr, the optical pulses produced by the pulse compressor 210 may have higher peak power. For example, in some instances, the optical pulse travelling in the pulse compressor 210 has a peak power of greater than 10 GigaWatts (GW) (which is approximately the critical power at which self-channeling effects appear for optical pulses in air at atmospheric pressure). The critical power at which self-channeling effects may appear can be described by the following equation:

$$P_{critical} = \frac{.148 \lambda^2}{n * n_2}$$

where n is the refractive index of the medium (e.g., n=1 for vacuum), and $n_2$ is the non-linear refractive index of the medium that is density dependent.

In the example CPA system 200 of FIG. 2, the diffraction gratings 212-215 have a ridged reflective surface that define part of the optical path in the pulse compressor 210, while the dispersive mirror 217 has a smooth reflective surface that defines part of the optical path in the pulse compressor 210. The example dispersive mirror 217 can be implemented as a highly dispersive mirror (HDM) composed of layers of dielectric materials disposed on a substrate (e.g., silica or sapphire). In some implementations, the dispersive mirror 217 includes alternating layers of high- and low-index dielectric materials. In the example shown, the high-index material has a refractive index greater than 1.7; for example, Titanium dioxide ($TiO_2$) having a refractive index of 2.5 may be used. In the example shown, the low-index material has a refractive index less than 1.7; for example, Silicon dioxide ($SiO_2$) having a refractive index of 1.45 may be used. In some implementations, the total physical thickness of the high-index dielectric material of the dispersive mirror 217 is approximately 4700 nm, while the total physical thickness of the low-index dielectric material of the dispersive mirror 217 is approximately 7700 m. In some implementations, the dispersive mirror 217 imparts a second order dispersion (or group delay dispersion) of approximately (+/−)300 $fs^2$ onto an optical pulse with a spectrum centered around 800 nm (e.g., having a spectrum of 730-870 nm). In some implementations, the second order dispersion characteristics of the dispersive mirror 217 are wavelength dependent.

Figure 3:
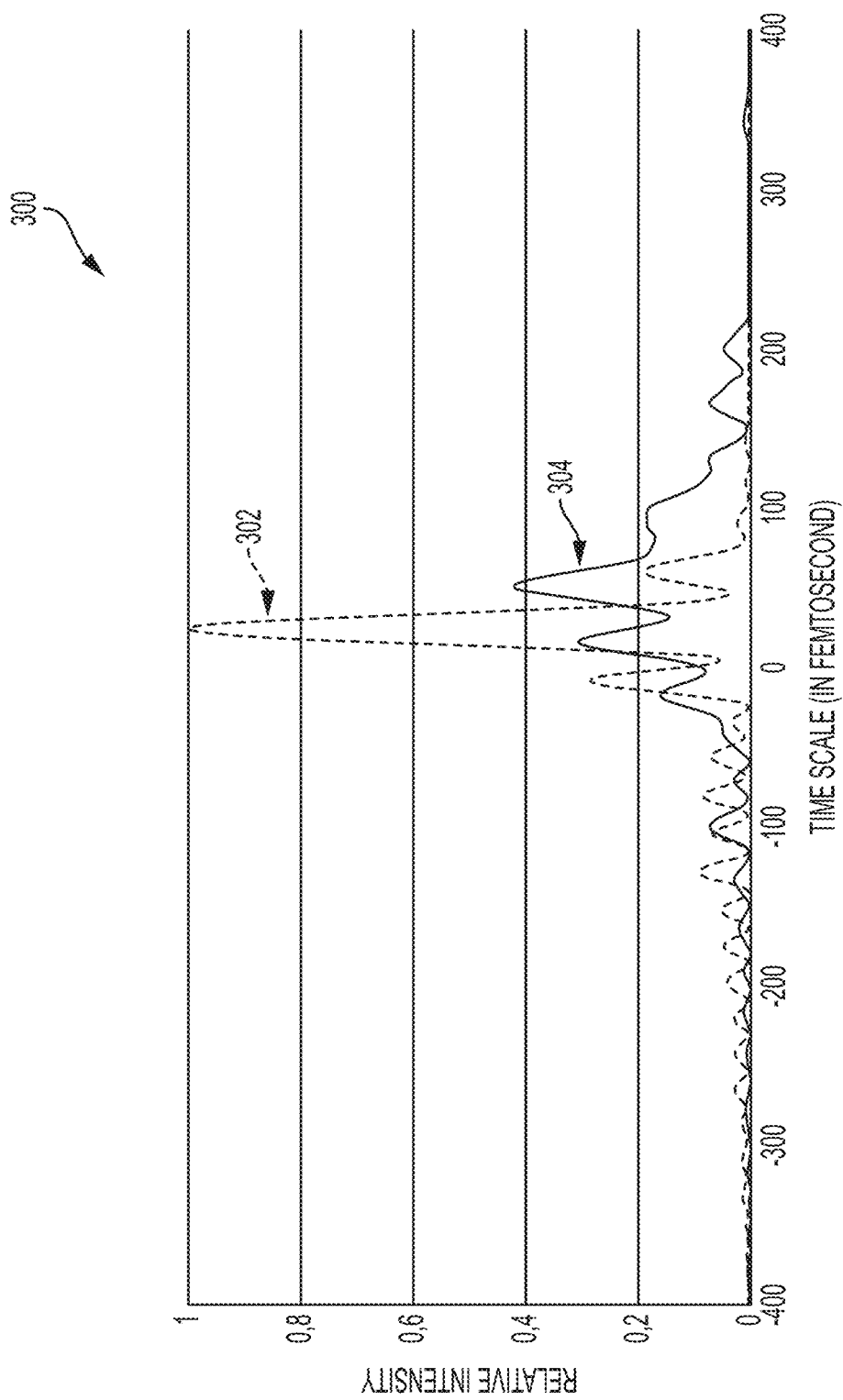
FIG. 3 is a plot showing example intensities incident upon a last diffraction grating in a pulse compressor of a pulse amplification system.

FIG. 3 is a plot 300 showing example intensities incident upon a last diffraction grating in a pulse compressor of a pulse amplification system. The example plot 300 includes traces 302 and 304, which indicate relative intensities with respect to the peak intensity of trace 302. Trace 302 is an example measurement of temporal intensity incident upon a last diffraction grating in a pulse compressor of a pulse amplification system, such as a CPA, where the pulse amplification system does not include a dispersive mirror in the optical path of the pulse compressor. Trace 304 is an example measurement of temporal intensity incident upon a last diffraction grating in a pulse compressor of a pulse amplification system, such as a CPA, that includes a dispersive mirror as the last optical element in the optical path of the pulse compressor. For instance, the measurements of trace 304 may be indicative of the intensity incident upon diffraction grating 215 of FIG. 2 relative to a system similar to what is shown in FIG. 2 except that it does not include the dispersive mirror 217. As indicated by the plot 300, the inclusion of a dispersive mirror 217 as the last optical element in the optical path of the pulse compressor 210 may reduce the intensity of the optical pulse incident upon the diffraction grating 215, which may allow for a longer lifespan and increased duty cycle of the diffraction grating.

Figure 4:
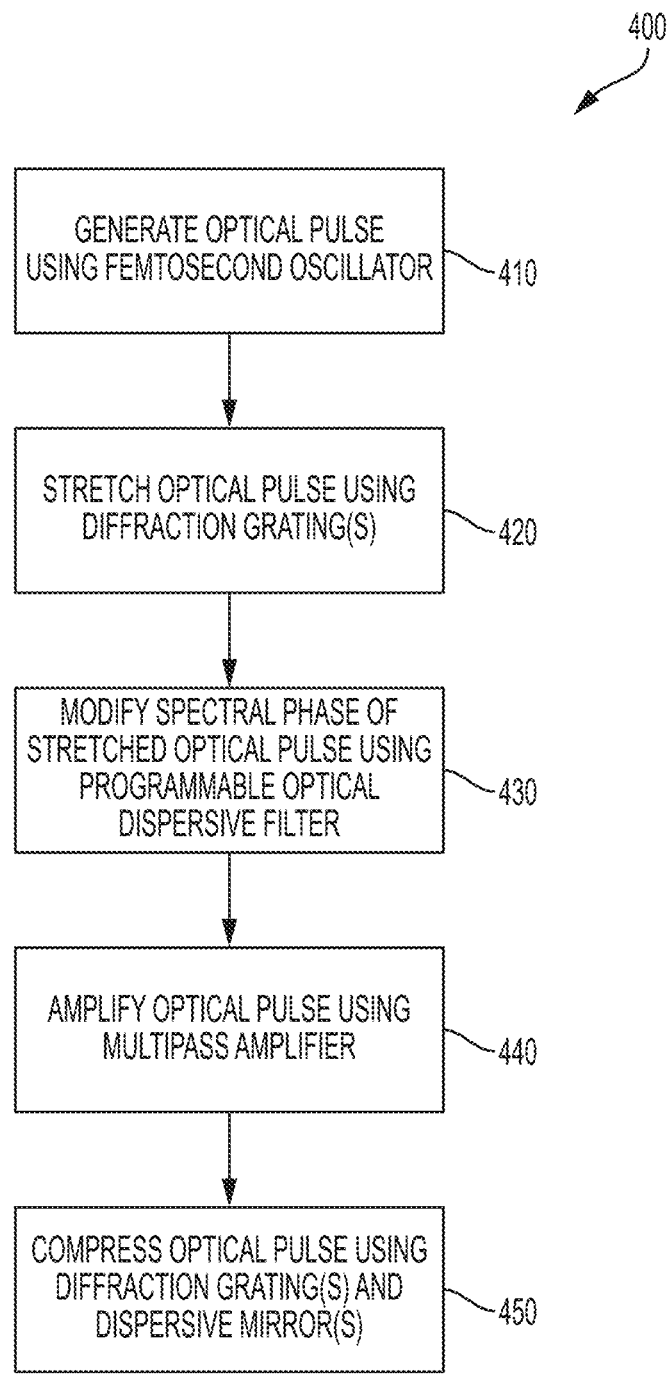
FIG. 4 is a flow diagram showing an example process for amplifying chirped optical pulses.

FIG. 4 is a flow diagram showing an example process 400 for amplifying chirped optical pulses. The process 400 may be implemented using the pulse amplification system 100 of FIG. 1, the CPA system 200 of FIG. 2 or another system. In some implementations, one or more operations of the process 400 are performed by optical elements or other components operating under high vacuum pressure. For example, the diffraction gratings and dispersive mirror that compress the optical pulse at 450 may reside in a vacuum chamber that operates at pressures below $10^{-3}$ Torr.

At 410, a chirped optical pulse is generated using a femtosecond oscillator, such as a femtosecond Ti:sapphire laser. At 420, the optical pulse is stretched using one or more diffraction gratings. The diffraction gratings may impart either positive or negative dispersion upon the optical pulse. At 430, the spectral phase of the stretched optical pulse is modified using a programmable optical dispersive filter (PODF). The PODF may be implemented using an AOPDF, which modifies the spectral phase of the optical pulse based on a received acoustic signal. At 440, the optical pulse is amplified using a multipass amplifier. At 450, the optical pulse is compressed using one or more diffraction gratings and dispersive mirrors. The diffraction gratings and dispersive mirrors may impart either positive or negative dispersion upon the optical pulse, which is the opposite of the dispersion imparted upon the optical pulse at 420. For instance, where positive dispersion is imparted upon the optical pulse at 420, negative dispersion may be imparted upon the optical pulse at 450.

In a general aspect of the examples described here, a chirped pulse laser system includes a pulse compressor with a dispersive mirror.

In a first example, a chirped pulse laser system includes a programmable optical dispersive filter (PODF) and a pulse compressor that receives an optical pulse based on an output of the PODF. The PODF is operable to modify a spectral phase of optical pulses. The pulse compressor includes optical elements in a vacuum chamber. The optical elements define an optical path through the pulse compressor, and are arranged to disperse the optical pulse in the optical path. The optical elements include diffraction gratings and a dispersive mirror. The dispersive mirror has a smooth reflective surface that defines a portion of the optical path.

Implementations of the first example may include one or more of the following features. The dispersive mirror may include one or more dielectric materials on a substrate. The dispersive mirror may include alternating layers of a high-index dielectric material and a low-index dielectric material. The high-index material may include Titanium dioxide ($TiO_2$) and the low-index material may include Silicon dioxide ($SiO_2$). The total thickness of the layers of Titanium dioxide ($TiO_2$) may be approximately 4700 nm, and the total thickness of the layers of Silicon dioxide ($SiO_2$) may be approximately 7700 nm. The dispersive mirror may be operable to impart a second order dispersion of approximately (+/−)300 $fs^2$ to the optical pulse.

Implementations of the first example may include one or more of the following features. The vacuum chamber may be configured to operate at pressures less than $10^{-3}$ Torr. The PODF may include an acousto-optic programmable dispersive filter (AOPDF), which may be operable to modify the spectral phase of an optical signal based on an acoustic signal received by the PODF. The optical elements of the pulse compressor may include a wave plate operable to modify a polarization of the optical pulse. The wave plate may reside in the optical path between the dispersive mirror and the last diffraction grating. The diffraction gratings may be arranged before the dispersive mirror in the optical path.

Implementations of the first example may include one or more of the following features. The system may include a pulse generator, a pulse stretcher that receives an output of the pulse generator, and a pulse amplifier that receives an output of the PODF. The pulse stretcher may include one or more optical elements that disperse optical pulses, and the pulse amplifier may be operable to increase a power of optical pulses. The pulse compressor may be arranged to receive an output of the pulse amplifier. The pulse generator may include a femtosecond laser oscillator.

Implementations of the first example may include one or more of the following features. The optical elements may define an optical path between an optical inlet of the pulse compressor and an optical outlet of the pulse compressor. The pulse compressor may include a first diffraction grating arranged to receive the optical pulse from the optical inlet, a second diffraction grating arranged to receive the optical pulse from the first diffraction grating, a third diffraction grating arranged to receive the optical pulse from the second diffraction grating, and a fourth diffraction grating arranged to receive the optical pulse from the third diffraction grating. The dispersive mirror may be arranged to provide the optical pulse to the optical outlet.

In a second example, compressing a chirped optical pulse includes modifying a spectral phase of an optical pulse by operation of a programmable optical dispersive filter (PODF) and compressing the optical pulse by operation of a pulse compressor. The pulse compressor includes optical elements in a vacuum chamber. The optical elements define an optical path in the pulse compressor, and are arranged to disperse the optical pulse in the optical path. The optical elements include diffraction gratings and a dispersive mirror. The dispersive mirror has a smooth reflective surface that defines a portion of the optical path.

Implementations of the second example may include one or more of the following features. The dispersive mirror may include one or more dielectric materials on a substrate. The dispersive mirror may include alternating layers of a high-index dielectric material and a low-index dielectric material. The high-index material may include Titanium dioxide ($TiO_2$) and the low-index material may include Silicon dioxide ($SiO_2$). The total thickness of the layers of Titanium dioxide ($TiO_2$) may be approximately 4700 nm, and the total thickness of the layers of Silicon dioxide ($SiO_2$) may be approximately 7700 nm. The dispersive mirror may be operable to impart a second order dispersion of approximately (+/−)300 $fs^2$ to the optical pulse. The vacuum chamber may be operated at pressures less than $10^{-3}$ Torr.

Implementations of the second example may include one or more of the following features. The method may include amplifying the optical pulse by operation of a pulse amplifier before compressing the optical pulse. The method may include generating the optical pulse using a femtosecond laser oscillator. The method may include stretching the optical pulse by operation of a pulse stretcher before modifying the spectral phase of the optical pulse. The pulse stretcher may include dispersive optical elements. The PODF may include an acousto-optic programmable dispersive filter (AOPDF), and the method may include modifying the spectral phase of the optical pulse base on an acoustic signal received by the AOPDF.

Implementations of the second example may include one or more of the following features. Compressing the optical pulse may include compressing the optical pulse by operation of the diffraction gratings before compressing the optical pulse by operation of the dispersive mirror. Compressing the optical pulse may include modifying a polarization of the optical pulse using a wave plate. Compressing the optical pulse may include imparting a second order dispersion of approximately (+/−)300 $fs^2$ to the optical pulse by operation of the dispersive mirror. The compressed optical pulse may have a peak power of greater than 10 GigaWatts (GW).

Implementations of the second example may include one or more of the following features. The optical elements may define an optical path between an optical inlet of the pulse compressor and an optical outlet of the pulse compressor. The pulse compressor may include a first diffraction grating arranged to receive the optical pulse from the optical inlet, a second diffraction grating arranged to receive the optical pulse from the first diffraction grating, a third diffraction grating arranged to receive the optical pulse from the second diffraction grating, and a fourth diffraction grating arranged to receive the optical pulse from the third diffraction grating. The dispersive mirror may be arranged to provide the optical pulse to the optical outlet.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A chirped pulse laser system comprising:
    a programmable optical dispersive filter (PODF) operable to modify a spectral phase of optical pulses; and
    a pulse compressor that receives an optical pulse based on an output of the PODF, the pulse compressor comprising optical elements in a vacuum chamber, the optical elements defining an optical path through the pulse compressor, the optical elements arranged to disperse the optical pulse in the optical path, the optical elements comprising diffraction gratings and a dispersive mirror, the dispersive mirror having a smooth reflective surface that defines a portion of the optical path.

2. The system of claim 1, wherein the dispersive mirror comprises one or more dielectric materials on a substrate.

3. The system of claim 2, wherein the dielectric materials comprise alternating layers of a high-index dielectric material and a low-index dielectric material.

4. The system of claim 3, wherein the high-index dielectric material comprises Titanium dioxide ($TiO_2$) and the low-index dielectric material comprises Silicon dioxide ($SiO_2$).

5. The system of claim 1, wherein the vacuum chamber is configured to operate at pressures less than $10^{-3}$ Torr.

6. The system of claim 1, wherein the PODF comprises an acousto-optic programmable dispersive filter (AOPDF).

7. The system of claim 1, wherein the optical elements comprise a wave plate operable to modify a polarization of the optical pulse.

8. The system of claim 7, wherein the wave plate resides in the optical path between the dispersive mirror and the last diffraction grating in the optical path.

9. The system of claim 1, wherein the diffraction gratings are arranged before the dispersive mirror in the optical path.

10. The system of claim 1, comprising:
    a pulse generator;
    a pulse stretcher that receives an output of the pulse generator, the pulse stretcher comprising one or more optical elements that disperse optical pulses; and
    a pulse amplifier that receives an output of the PODF, the pulse amplifier operable to increase a power of optical pulses; and
    wherein the pulse compressor is arranged to receive an output of the pulse amplifier.

11. The system of claim 10, wherein the pulse generator comprises a femtosecond laser oscillator.

12. The system of claim 1, wherein the optical elements define an optical path between an optical inlet of the pulse compressor and an optical outlet of the pulse compressor, and the pulse compressor comprises:
    a first diffraction grating arranged to receive the optical pulse from the optical inlet;
    a second diffraction grating arranged to receive the optical pulse from the first diffraction grating;
    a third diffraction grating arranged to receive the optical pulse from the second diffraction grating;
    a fourth diffraction grating arranged to receive the optical pulse from the third diffraction grating; and
    the dispersive mirror arranged to provide the optical pulse to the optical outlet.

13. A method of compressing a chirped optical pulse comprising:
    modifying a spectral phase of an optical pulse by operation of a programmable optical dispersive filter (PODF); and
    compressing the optical pulse by operation of a pulse compressor, the pulse compressor comprising optical elements in a vacuum chamber, the optical elements defining an optical path in the pulse compressor, the optical elements arranged to disperse the optical pulse in the optical path, the optical elements comprising diffraction gratings and a dispersive mirror, the dispersive mirror having a smooth reflective surface that defines a portion of the optical path.

14. The method of claim 13, wherein the dispersive mirror comprises one or more dielectric materials on a substrate.

15. The method of claim 14, wherein the dielectric materials comprise alternating layers of a high-index dielectric material and a low-index dielectric material.

16. The method of claim 15, wherein the high-index dielectric material comprises Titanium dioxide ($TiO_2$) and the low-index dielectric material comprises Silicon dioxide ($SiO_2$).

17. The method of claim 13, comprising operating the vacuum chamber at a pressure less than $10^{-3}$ Torr.

18. The method of claim 13, wherein the PODF comprises an acousto-optic programmable dispersive filter (AOPDF), and the method comprises modifying the spectral phase of the optical pulse based on an acoustic signal received by the AOPDF.

19. The method of claim 13, comprising amplifying the optical pulse by operation of a pulse amplifier before compressing the optical pulse.

20. The method of claim 13, comprising generating the optical pulse using a femtosecond laser oscillator.

21. The method of claim 13, comprising stretching the optical pulse by operation of a pulse stretcher before modifying the spectral phase of the optical pulse, the pulse stretcher comprising dispersive optical elements.

22. The method of claim 13, wherein compressing the optical pulse comprises compressing the optical pulse by operation of four diffraction gratings before compressing the optical pulse by operation of the dispersive mirror.

23. The method of claim 13, wherein compressing the optical pulse comprises modifying a polarization of the optical pulse using a wave plate.

24. The method of claim 13, wherein the compressed optical pulse has a peak power greater than 10 GigaWatts (GW).

* * * * *